United States Patent

[11] 3,633,484

[72] Inventors Yoshizo Ikegami;
Kuniomi Abe; Maskazu Nagai; Susumu Fukuda; Takehiko Kakei, all of Nishinomiya, Japan
[21] Appl. No. 22,311
[22] Filed Mar. 24, 1970
[45] Patented Jan. 11, 1972
[73] Assignee Fuji Photo Film Co., Ltd. Kanagawa, Japan
[32] Priority Mar. 25, 1969
[33] Japan
[31] 44/22615

[54] ELECTROMAGNETIC SHUTTER MECHANISM FOR A CAMERA
3 Claims, 3 Drawing Figs.

[52] U.S. Cl................................................. 95/53 R, 95/59
[51] Int. Cl..................................................... G03b 9/10
[50] Field of Search............................................95/53, 53 E, 53 EA, 53 EB, 58, 59, 62, 63

[56] References Cited
UNITED STATES PATENTS

| | | | |
|---|---|---|---|
| 3,452,662 | 7/1969 | Singer | 95/53 |
| 660,006 | 10/1900 | Doyen | 95/59 |
| 359,902 | 3/1887 | Steffens | 95/53 |
| 3,055,281 | 9/1962 | Anderson | 95/59 |
| 3,522,763 | 8/1970 | Dietz | 95/53 |

Primary Examiner—Samuel S. Matthews
Assistant Examiner—Monroe H. Hayes
Attorney—Sughrue, Rothwell, Mion, Zinn & Macpeak ABSTRACT: A pivotable shutter blade is spring biased to closed position and carries a pin fixed thereto for closing a switch to the time-constant circuit, which in turn energizes an electromagnet which momentarily maintains the shutter in open position for a time dependent upon full charging of the condenser of the time-constant circuit. The face of the electromagnet is parallel with the plane of the shutter.

INVENTORS
YOSHIZO IKEGAMI
KUNIOMI ABE
MASKAZU NAGAI
SUSUMO FUKUDA
TAKEHIKO KAKEI

BY Sughrue, Rothwell, Mion, Zinn & Macpeak

ATTORNEYS

ELECTROMAGNETIC SHUTTER MECHANISM FOR A CAMERA

BACKGROUND OF THE INVENTION

1. Field of the Invention

This invention relates to an electromagnetic shutter mechanism for a camera, and, more particularly, to a shutter mechanism of this type which is simple in construction.

2. Description of the Prior Art

Heretofore, various automatic electric shutters have been developed which utilize a light receptor such as a cadmium sulfide element for controlling the same. In such automatic shutters, the light value of the object being photographed is measured by the light receptor, which in turn is electrically connected to a condenser. The time for full charging of the condenser corresponds to the light value of the object being photographed. Utilizing a time-constant circuit, a mechanism for closing the shutter blade is actuated when the condenser is charged to the predetermined voltage. Thus, the right exposure is always provided for the camera film.

In such conventional electrical shutters, a magnetic mechanism is employed to actuate the lever mechanism for, in turn, operating the shutter blade, and such lever mechanisms are highly complicated. Due to the complexity of the lever mechanism associated with the magnet, the overall structure of the shutter becomes large as well as complicated. The reason for such complexity is partly due to the fact that residual magnetism remains in the shutter blade if the magnet directly contacts the shutter blade. Due to the presence of residual magnetism in the shutter blade, the duration of shutter opening is materially affected by the magnetism.

SUMMARY OF THE INVENTION

It has been discovered and recognized that the residual magnetism will not actually or practically affect the shutter opening duration, where the camera is of simple construction. That is, the variation in shutter opening duration is negligible in terms of practical use of cameras employing an electromagnetic shutter mechanism of the present invention which is simple in construction. The present invention further provides an electromagnetic shutter mechanism which includes means for insuring that the shutter blade is brought into contact with the magnet. Further, the simplicity of the construction of the electromagnetic shutter mechanism of the present invention insures continued operation with high certainty.

Other objects of the present invention and the advantages thereof will become apparent from the following description, taken in conjunction with the accompanying drawing.

DESCRIPTION OF THE PREFERRED EMBODIMENT

Figure 1:
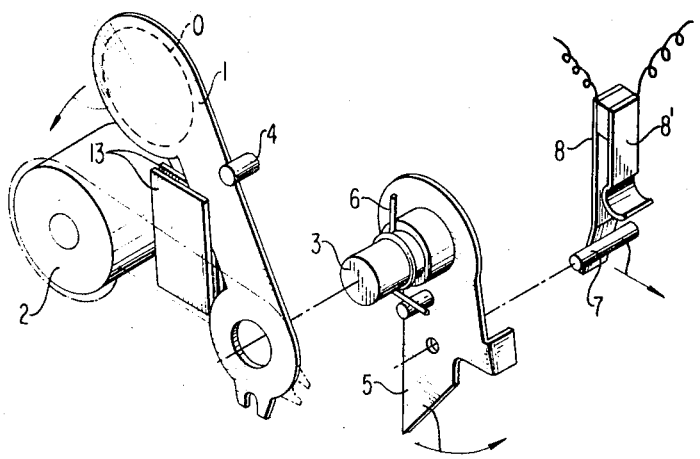
FIG. 1 is a fragmentary, perspective view of the main elements of the electromagnetic shutter mechanism in accordance with the present invention.
Figure 2:
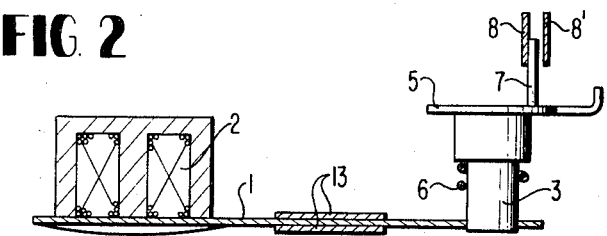
FIG. 2 is a top plan view, partially in sections, of the shutter mechanism components of FIG. 1.

Referring to the drawing which illustrates one embodiment of the electromagnetic shutter mechanism in accordance with the present invention, a single shutter blade 1 is fixed to one end of a pivotable member 3 to which, in turn, at the opposite end a shutter actuating lever 5 is fixedly coupled. As such, the single shutter blade 1 lies in a plane parallel with the plane in which the shutter actuating lever 5 pivots. The single shutter blade 1 is selectively moved to two positions, one of which in the illustrated in full lines, is in alignment with aperture O of the camera, while the other illustrated in dotted lines is out of alignment with the aperture O but in alignment with a cylindrical magnet 2. Thus, the former position is a closed position while the latter position is the open position. The closed position of the single shutter blade 1 is determined by pin 4 which is secured to the camera casing (not shown) near the aperture. The attracting face of the cylindrical magnet 2 lies parallel to the plane of movement of the blade 1 and adjacent thereto so that the shutter blade 1 in moving from the full line position to the dotted line position crosses the magnetic flux emanating from the magnet 2. The shutter actuating lever 5 is fixedly secured to the pivotable member 3 and is made in such a manner as to be flipped by a member (not shown) connected with the shutter releasing mechanism such that it rotates in the counterclockwise direction as indicated by the arrow, but is returned back to the original position shown in full lines by the coil spring 6 in conventional fashion. An elongated pin 7 is secured to the shutter actuating lever 5 extending coaxially with pivot shaft 3 but on the opposite side of the actuating lever 5 from the shutter blade 1. When the shutter blade 1 starts to move toward an open position in response to counterclockwise rotation of the shutter actuating lever 5, the pin 7 on the lever 5 moves away from contact 8 and allows contacts 8 and 8' to close. The contacts 8 and 8' constitute a switch for connecting the magnet 2 to means for energizing the same. Accordingly, therefor, when pin 7 moves out of contact with switch contact 8, the electromagnet 2 is energized to attract the shutter blade 1 and hold the blade 1 at the shutter open position.

Figure 3:
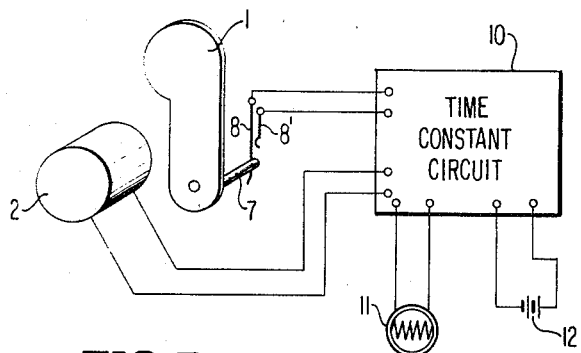
FIG. 3 is a partial schematic of the electromagnetic shutter mechanism of the present invention illustrating the electrical circuit diagram associated associated with the electromagnetic shutter mechanism of the present invention.

FIG. 3 illustrates schematically in conjunction with the electrical circuit diagram, the manner in which the electromagnetically operated shutter of the present invention operates. The mechanism includes a conventionally known time-constant circuit which is indicated in block form at 10 and is electrically coupled to a photoelectric element such as a cadmium sulfide element 11 in conventional manner. In similar fashion to conventional electrical shutter mechanisms, when contacts 8—8' are closed in response to the initial opening movement of shutter blade 1, a condenser (not shown) forming a portion of the time-constant circuit 10 is charged from battery 12 or a like source of voltage under the control of the photoelectric element 11. During charging, the magnet 2 is energized to hold the shutter blade 1 at the open position indicated in dotted lines in FIG. 1/ The time for charging the condenser in the time-constant circuit 10 depends on the value of the electric current flowing tin the circuit, which in turn depends upon the resistance of the photoelectric element 11. The resistance of the photoelectric element depends upon the light value impinging upon the same, thus, the right exposure time is always obtained. A full and detailed description of the conventional time-constant circuit 10 is omitted herein.

The operation of the shutter mechanism in accordance with the present invention as described above involves turning of the shutter blade 1 in the counterclockwise direction as shown by the arrow in FIG. 1. Prior to initiating this movement, the pin 7 which is fixed to the shutter actuating lever 5 is in contact with switch contact 8 maintaining it out of contact with contact 8' of the same switch. After slight rotation counterclockwise of the actuating lever 5, contacts 8 and 8' close to energize the magnet 2. Since the magnet 2 is energized and the shutter blade 1 continues to turn in the counterclockwise direction, the shutter blade 1 continues to turn in the counterclockwise direction, the shutter blade 1 continues to turn in the counterclockwise direction, the shutter blade moves into overlying position with respect to the electromagnet 2 and is held by the magnet 2 at the broken line position. During the time that the shutter is held by magnet 2 as at the position shown by the broken line, the film in the camera is being exposed. Simultaneously, the photoelectric element 11 receives the incident light from the object and causes the condenser to be charged to its full capacity. According to the light value received from the object, the time for fully charging the condenser varies. When the condenser in the time-constant circuit is fully charged, the magnet is deenergized to release the shutter blade 1, allowing it to return under the bias of spring 6 to its initial position against pin 4.

The present invention is further directed to an improvement which insures that the blade 1 when moved form closed to fully open position is attracted by and held by the magnet with maximum certainty. In practice, it is difficult to slide the shutter blade along a plate in contact therewith due to the mechanical operation involve. By providing a guide member in the vicinity of the magnet 2 for guiding the shutter blade along the end face of magnet 2 and into position so as to fully contact the end face of the magnet, the shutter blade can move to open position and held by magnet 2 with maximum certainty. The guide member of the present invention constitutes a pair of spaced plate members which are generally disposed in parallel with the plane of rotation of the shutter blade, on opposite sides thereof, and are so formed as to guide the shutter blade into position along a skewed path to insure moving the shutter blade into contact position with the end surface of the magnet when the blade 1 overlies the end face of the magnet 2.

It is apparent that the above-described construction is equally applicable to shutter mechanisms employing a plurality of shutter blades. Take a twin shutter blade construction, for instance, 2 magnets may be provided, one for each shutter blade, or alternatively a single magnet may be provided for one of the shutter blades, which is mechanically interlocked with one another. The provision of the magnet for holding the shutter blade may vary from the arrangement described above such that the shutter blade itself has an end portion which is bent and it is this bent portion which is brought into contact with the magnet. In such a case, the magnet is so located that the shutter blade is moved along a path crossing the magnetic flux and the shutter blade then moves smoothly and is softly held by the magnet once position is achieved.

What is claimed is:

1. An electromagnetic shutter mechanism for a camera including a shutter blade movable between aperture closing and aperture opening position, a time-constant circuit employing condenser, a voltage source for charging said condense, and a photoelectric element for controlling the charging rate thereof, the improvement comprising: an electromagnet, for maintaining said shutter in aperture open position, and energizable by said voltage source for a time determined by said time-constant circuit, spring biasing means for biasing said shutter blade toward aperture closing position, said electromagnet being positioned such that the end face thereof lies parallel to but spaced slightly form the plane defined by a portion of said shutter blade when in full closed position, and means for insuring full face contact between at least a portion of said shutter blade and said electromagnet when said blade moves into full open position.

2. The shutter mechanism, as claimed in claim 1, further comprising skewed plates disposed on each side of said movable shutter blade in spaced parallel fashion adjacent to said magnet to cause said shutter blade to move into contact with the end face of said magnet when in full open position.

3. The shutter mechanism as claimed in claim 1, wherein the leading edge of said shutter blade is bent away from the pale defined by the end face of said electromagnet while the surface of the trailing edge of the same facing said electromagnet is coplanar therewith so as to effect full face contact between said trailing edge and the end face of said electromagnet when said blade moves into full open position.

* * * * *